(12) United States Patent
Hendriks et al.

(10) Patent No.: US 7,394,598 B2
(45) Date of Patent: * Jul. 1, 2008

(54) ELECTROWETTING OPTICAL SWITCH

(75) Inventors: Bernardus Hendrikus Wilhelmus Hendriks, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 538 days.

This patent is subject to a terminal disclaimer.

(21) Appl. No.: 10/527,868

(22) PCT Filed: Sep. 12, 2003

(86) PCT No.: PCT/IB03/04030

§ 371 (c)(1),
(2), (4) Date: Mar. 16, 2005

(87) PCT Pub. No.: WO2004/027490

PCT Pub. Date: Apr. 1, 2004

(65) Prior Publication Data

US 2005/0281503 A1  Dec. 22, 2005

(30) Foreign Application Priority Data

Sep. 19, 2002 (EP) .................................. 02078939
Dec. 18, 2002 (EP) .................................. 02080387

(51) Int. Cl.
*G02B 1/06* (2006.01)
*G02B 26/10* (2006.01)

(52) U.S. Cl. ........................ 359/665; 359/666; 359/228; 385/16

(58) Field of Classification Search ................. 359/228, 359/290–297, 665–667; 385/16–23
See application file for complete search history.

(56) References Cited

U.S. PATENT DOCUMENTS

| | | | | |
|---|---|---|---|---|
| 3,641,354 A | * | 2/1972 | De Ment | ...................... 250/216 |
| 4,701,021 A | | 10/1987 | Le Pesant et al. | |
| 5,091,801 A | * | 2/1992 | Ebstein | ...................... 359/665 |
| 5,973,852 A | | 10/1999 | Task | |
| 6,288,846 B1 | | 9/2001 | Stoner, Jr. | |
| 6,408,112 B1 | | 6/2002 | Bartels | |

(Continued)

FOREIGN PATENT DOCUMENTS

EP        1069450 A2      1/2001

(Continued)

*Primary Examiner*—Darryl J Collins

(57) ABSTRACT

A switchable optical element having a first discrete state and a different, second discrete state. The element comprises a fluid system including a first fluid (44) and a different, second fluid (46), a wavefront modifier (26) having a face (28); and a fluid system switch for acting on the fluid system to switch between the first and second discrete states of the element. When the element is in the first discrete state, the face (28) of the wavefront modifier (26) is substantially covered by the first fluid (44). When the element is in the second discrete state, the face of the wavefront modifier is substantially covered by the second fluid (46). The fluid system switch comprises a configuration of electrodes arranged to act on the fluid system by the application of electrowetting forces and a voltage control system arranged to control voltages applied to the configuration of electrodes to switch between the first and second discrete states of the element.

19 Claims, 10 Drawing Sheets

U.S. PATENT DOCUMENTS 6,473,543 B2 * 10/2002 Bartels ................. 385/16

FOREIGN PATENT DOCUMENTS

| EP | 1069450 | A2 | 8/2003 |
| WO | WO9946624 | A1 | 9/1999 |
| WO | WO0058763 | A1 | 10/2000 |
| WO | WO0249024 | A1 | 6/2002 |
| WO | WO02082437 | A1 | 10/2002 |

* cited by examiner

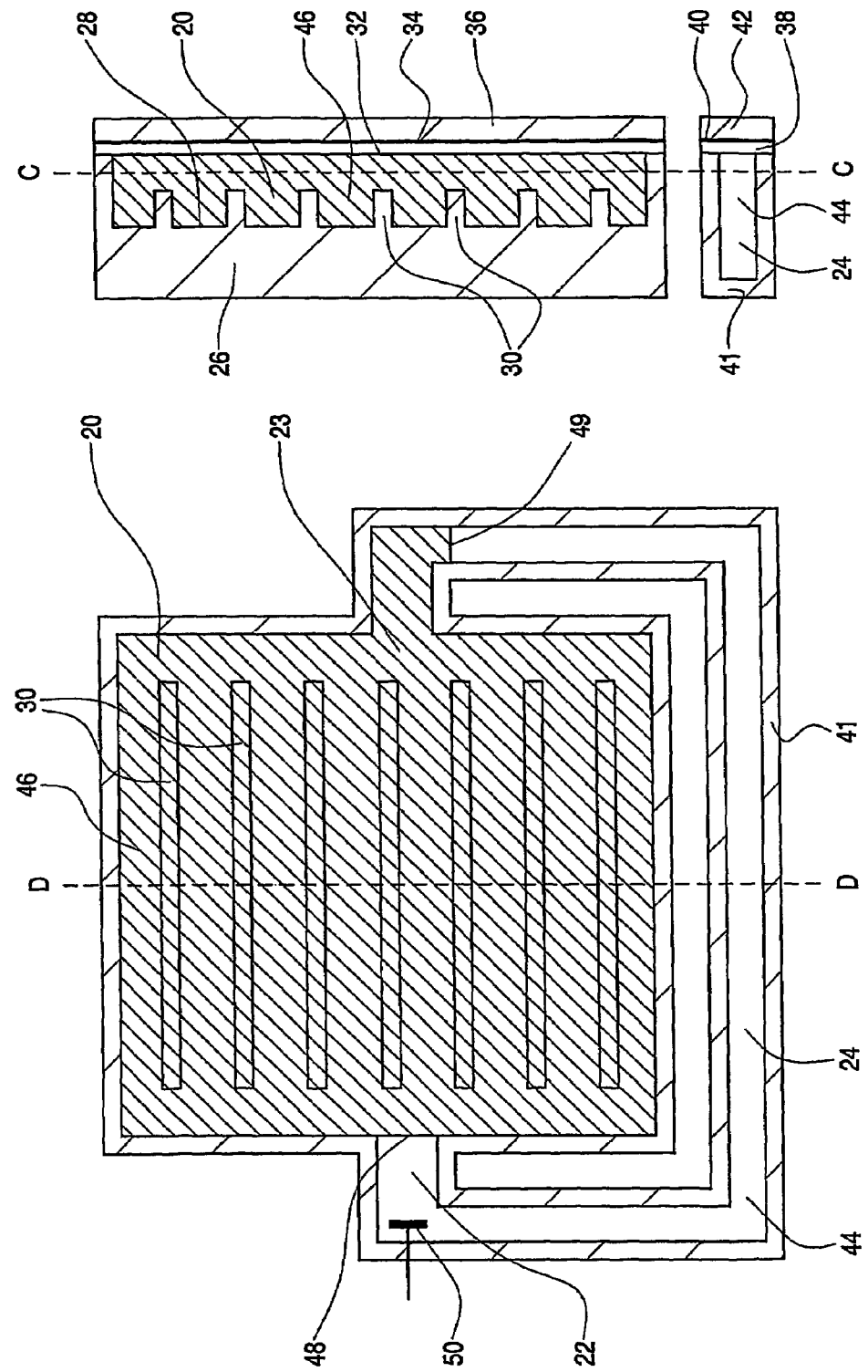

ELECTROWETTING OPTICAL SWITCH

FIELD OF THE PRESENT INVENTION

The present invention relates to a switchable optical element, particularly but not exclusively one which is suitable for use in an optical scanning device for scanning the information layers of different types of optical record carrier, and to an optical scanning device including such an element.

BACKGROUND

Data can be stored in the form of information layers of optical record carriers such as compact discs (CDs), conventional digital versatile discs (DVDs) and so-called Blu-Ray™ discs.

Blu-Ray™ discs have recently been proposed following the advent of blue laser diodes that emit light at a significantly shorter wavelength than the red laser diodes used to read or write data from conventional DVDs. As the wavelength of the blue laser diode is shorter than that of more commonly used red laser diodes, the blue laser diode can form a smaller spot on the disc, and hence the information layer tracks of Blu-Ray™ discs can be more closely spaced than those of conventional DVDs, which in turn means that Blu-Ray™ discs can have a greater storage capacity than conventional DVDs—typically at least a twofold increase in storage capacity can be obtained.

To avoid customers having to purchase a variety of different devices for reading or writing data from or to specific types of optical record carrier, it is desirable for a single optical scanning device to be capable of reproducing data from a number of optical record carriers of different formats.

However, this aim is not easy to accomplish as the different record carrier formats and the associated scanning devices have differing characteristics. For example, CDs are available, inter alia, as CD-A (CD-audio), CD-ROM (CD-read only memory) and CD-R (CD-recordable), and are designed to be scanned with a laser wavelength of about 785 nm and a numerical aperture (NA) of 0.45. DVDs, on the other hand, are designed to be scanned at a laser wavelength in the region of 650 nm, and Blu-Ray™ discs are designed to be scanned at a laser wavelength in the region of 405 nm. For reading DVDs and NA of 0.6 is generally used, whereas for writing DVDs and NA of 0.65 is generally required.

A complicating factor is that discs designed to be read out at a certain wavelength are not always readable at another wavelength. An example is the CD-R in which special dyes are applied in the recording stack in order to obtain a high signal modulation at 785 nm wavelength. At 650 nm wavelength the modulation of the signal from the disc becomes so small due to the wavelength sensitivity of the dye that readout at this wavelength is not feasible.

When introducing a new record carrier system with higher data capacities it is important that the new devices for reading and writing are backward compatible with the existing record carriers in order to obtain a high acceptance level in the market. Therefore, the DVD system must contain a 785 nm laser and a 650 nm laser to be able to read all existing CD types. Similarly, a system capable of reading all of CD, DVD and Blu-Ray™ discs should contain a 785 nm laser, a 650 nm laser and a 405 nm laser.

Different types of record carrier also differ in the thickness of their transparent substrates, which typically act as a protective layer for the data carrying layer of the disc, and as a result the depth of the data layer from the entrance face of the record carrier varies from record carrier type to record carrier type. For example, the data layer depth for DVDs is about 0.6 mm, whereas the data layer depth for CDs is about 1.2 mm. The spherical aberration incurred by the radiation beam traversing the protective layer is generally compensated in an objective lens of the optical scanning device.

As a result of these different characteristics for different types of record carrier, problems can result if it is attempted to read data, for example, from a record carrier with an optical scanning device that has been optimized for another, different type of record carrier. For example, large amounts of spherical aberration and a non-negligible amount of spherochromatism can be caused if one type of carrier medium is read with an objective lens that has been optimized for another. The device could be provided with three objective lenses, one for each wavelength. However, this solution would be relatively expensive.

It is therefore highly preferable to provide a device which has a single optical objective lens for scanning a variety of different optical carrier mediums using different wavelengths of laser radiation.

International patent application WO 02/082437 describes such an objective lens for use within an optical scanning device for reading data from three different types of record carrier. The lens has a phase structure which is arranged in the path of the radiation beam. This phase structure comprises a plurality of phase elements of different heights which when viewed in profile are arranged as a series of steps. The different heights of the phase elements are related and arranged so as to produce a desired wavefront modification of the radiation beam of a specific wavelength for reading a specific type of record carrier.

Systems of the type described by WO 02/082437 provide a solution to the problem of scanning three different types of optical record carrier with the associated different wavelengths of radiation beam using one objective lens within the optical scanning device. However, the phase structures involved are often of a complex nature, the phase elements having a large range of different heights. Such phase structures can be difficult to design and manufacture to a level at which a high optical efficiency for each wavelength is achieved. Additionally they can be relatively expensive to manufacture.

Various systems have been proposed in which a fluid system is used to provide an optical element with variable characteristics.

U.S. Pat. No. 5,973,852 describes a fluid filled variable power optical lens. The lens includes a housing having an optically transparent elastic membrane disposed over one end of a chamber which contains a fluid. A pump assembly is used for inserting or withdrawing fluid from the chamber, whereby the membrane is correspondingly selectively bulged outwardly or inwardly in the shape of a convex or concave lens. International patent application WO 00/58763 describes an electrowetting based system whereby the curvature of a fluid meniscus between two different fluid bodies can be changed. It is proposed that the system may be used as a variable lens.

U.S. Pat. No. 6,288,846 describes systems in which a fluid system can be switched between two different discrete states in order to provide different wavefront modifications. A refractive index difference of approximately zero is established between a fluid and a wavefront modifier, when the system is in one of these states, in order to leave the radiation beam unchanged. In the other state of the system this refractive index difference is of a sufficient value such that the path of the radiation beam is modified. A fluid-handling system is used to switch the fluid system. Examples of the fluid handling system include manually or motorized hypodermic syringes, peristaltic pumps, compressible bulbs, and piezoelectric, hydraulic or pneumatic actuators.

U.S. Pat. No. 6,408,112 describes an optical switch which includes a fluid system housed in channels and cavities within the component. Piezoelectric actuators, which are arranged in the cavities, cause the liquid to be displaced in the channels. In one embodiment, the liquid passes over the face of a wavefront modifier including a relief structure in the form of a Fresnel lens. In one embodiment, one of the two fluid components of the fluid system is a gas which is compressed when the liquid is moved into place over the relief structure. However, such a component requires an upright orientation to be maintained in order to prevent the gas from being located at the part of the system containing the piezoelectric pump. It is also described that two suitable liquids may be used. However, one drawback is the reliability of the switching process, particularly when a relief structure is used, where fluid flow is not entirely smooth. Requiring smooth fluid flow during switching also limits the speed of switching.

SUMMARY OF THE INVENTION

It is an object of the present invention to provide a switchable optical element, including a wavefront modifier, which can be switched in a reliable and efficient manner between at least first and second discrete states.

In accordance with the present invention there is provided a switchable optical element having a first discrete state and a different, second discrete state, the element comprising:

a) a fluid system including a first fluid and a different, second fluid;

b) a wavefront modifier having a face; and c) a fluid system switch for acting on the fluid system to switch between the first and second discrete states of the element, wherein, when the element is in the first discrete state, the face of the wavefront modifier is substantially covered by the first fluid, and when the element is in the second discrete state, the face of the wavefront modifier is substantially covered by the second fluid, characterized in that said fluid system switch comprises:

a configuration of electrodes arranged to act on the fluid system by the application of electrowetting forces; and a voltage control system arranged to control voltages applied to the configuration of electrodes to switch between the first and second discrete states of the element.

By use of the configuration of electrodes and its associated voltage control system to switch between the first and second discrete states by the application of electrowetting forces, an improved fluid switching system is provided whereby the face of the wavefront modifier may be selectively covered by the different fluids. Electrowetting forces may be used to alter the wettability of a surface arranged on or adjacent to the face of the wavefront modifier, thereby to provide an active repulsive or attractive force to the liquids respectively, thereby to ensure relatively fast and reliable switching. By switching the degree of wetting, removal of one fluid from, and positioning of the other fluid on, the face of the wavefront modifier, is facilitated.

Preferably, the fluid system is arranged to move between the first and second states in a circulatory manner. In this way, switching can be achieved without the need for moving parts, even when the two fluids comprise two different liquids.

The switchable optical element of the present invention can be included in an appropriate optical scanning device for the scanning of three different optical record carriers, each record carrier requiring use of a radiation beam with a different wavelength. The face of the wavefront modifier for providing a predetermined wavefront modification can be formed of a simple structure which is easy and efficient to manufacture.

The providing of different discrete states of the switchable optical element of the present invention in which different fluids, each having a different refractive index to each other, introduces an extra degree of freedom to design the wavefront modifier, in this case a phase structure, suitable for more than one wavelength of radiation beam. The wavefront modifier provides a predetermined wavefront modification in each discrete state to a radiation beam of a predetermined wavelength. A step height h of protrusions of the face of the wavefront modifier made of a material having a refractive index n at wavelength λ of a given radiation beam, where the refractive index of the fluid covering the face of the wavefront modifier is $n_s$, is given by $$\Phi = 2\pi \frac{h(n - n_s)}{\lambda} \quad (1)$$

Consequently, when the wavelength of the given radiation beam changes the wavefront modification performed by the protrusions of the wavefront modifier face changes. Furthermore, when changing the refractive index n, by changing the fluid covering the face of the wavefront modifier, a change in the wavefront modification performed by the face of the wavefront modifier is generated. It is therefore possible to simply provide different desired wavefront modifications to radiation beams having different wavelengths specific to the type of record carrier being read.

Further features and advantages of the present invention will become apparent from the following description of preferred embodiments of the invention, given by way of example only, made with reference to the accompanying drawings.

BRIEF DESCRIPTION OF THE DRAWINGS

FIGS. 3 and 4 show schematic cross-sections, along lines C-C and D-D respectively, of the switchable optical element of FIGS. 1 and 2, when in a second discrete state;

DETAILED DESCRIPTION OF PREFERRED EMBODIMENTS

Figure 2:
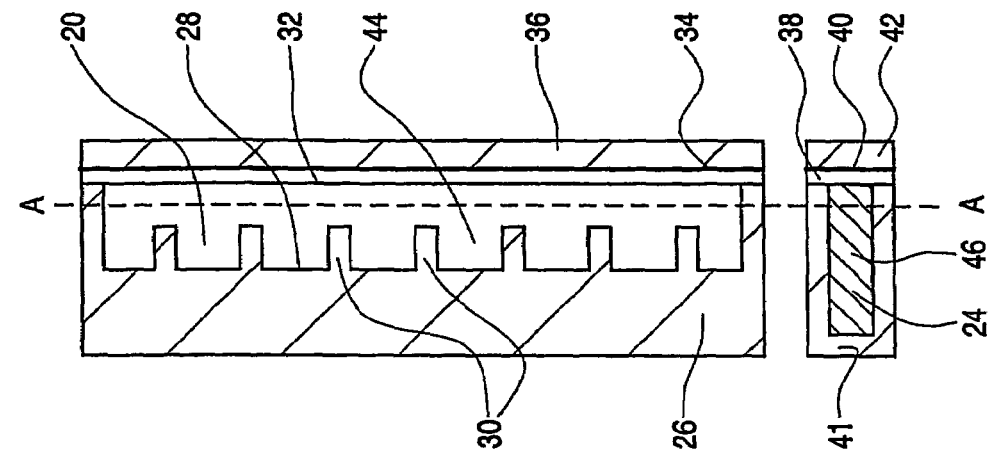
FIGS. 1 and 2 show schematic cross-sectional diagrams, along lines A-A and B-B respectively, of a switchable optical element in accordance with one embodiment of the present invention, when in a first discrete state.

Referring to FIGS. 1 to 4, one embodiment of switchable optical element in accordance with the present invention includes a chamber 20, fluidly connected via two openings 22, 23 of the chamber to a conduit 24 having two opposite ends. The first opening 22 of the chamber is fluidly connected to the first end of the conduit and the second opening 23 of the chamber is fluidly connected to the second end of the conduit so as to form a fluid-tight enclosure for a fluid system. One side of the chamber 20 is enclosed by a wavefront modifier 26 and has a face 28 exposed to the interior of the chamber 20. The wavefront modifier is formed from a transparent material, for example polycarbonate. The face 28 of the wavefront modifier comprises a solid relief structure in the form of protrusions 30 which form a series of spaced linear ridges lying parallel each other across the surface of the face of the wavefront modifier 28. The arrangement of protrusions 30 of the face of the wavefront modifier 28 in this embodiment form a linear optical diffraction grating. FIGS. 1 to 4 show the grating schematically, with the protrusions 30 having an equal height. However, the protrusions may be of different heights to each other. Also, the size of the protrusions is exaggerated; in preferred embodiments the heights of the protrusions are of the order of 1 μm. Furthermore, as will be understood from the description below, circular concentric diffraction gratings and non-periodic phase structures may also be provided, in which the protrusions are annular or at least form annular sections.

The chamber 20 is further enclosed by a cover plate 36, which is a planar element formed from a transparent material, for example polycarbonate. The cover plate 36 is covered in a hydrophobic fluid contact layer 32, which is transparent and formed for example of Teflon™ AF1600 produced by DuPont™. One surface of this hydrophobic fluid contact layer 32 is exposed to the interior of the chamber 20. A first electrowetting electrode 34 lies between the cover plate 36 and the hydrophobic fluid contact layer 32. This first electrowetting electrode 34 is formed as a sheet of a transparent electrically conducting material, for example indium tin oxide (ITO). An insulating layer (not shown), formed for example of parylene, may be formed between the fluid contact layer 32 and the first electrowetting electrode 34. It is to be noted that the first electrowetting electrode 34 has an operative area which completely overlaps with the area occupied by the series of ridges 30 of the face 28 of the wavefront modifier. The hydrophobic fluid contact layer 32 has a surface area which completely overlaps the series of ridges 30 of the face 28 of the wavefront modifier.

The conduit 24 is formed between conduit walls 41 and a cover plate 40. The cover plate is covered by a hydrophobic fluid contact layer 38 exposed on one surface to the interior of the conduit 24, the hydrophobic fluid contact layer being formed for example of AF1600™. A second electrowetting electrode 40 lies between the cover plate 42 and the hydrophobic fluid contact layer 38. This electrode is formed from an electrically conductive material, for example indium tin oxide (ITO). It is to be noted that the second electrowetting electrode 40 has a surface area which overlaps with most of the interior of the conduit 24.

The enclosed fluid system comprises a first fluid 44 and a second fluid 46. The first fluid 44 comprises an aqueous electrically conductive fluid, for example salted water, having a predetermined refractive index. The second fluid comprises an oil based electrically insulative fluid, for example silicone oil. In this embodiment of the present invention, the first fluid 44 and the second fluid 46 are both liquids. The first fluid 44 and the second fluid 46 lie in contact with each other at two fluid menisci 48, 49.

Figure 1:
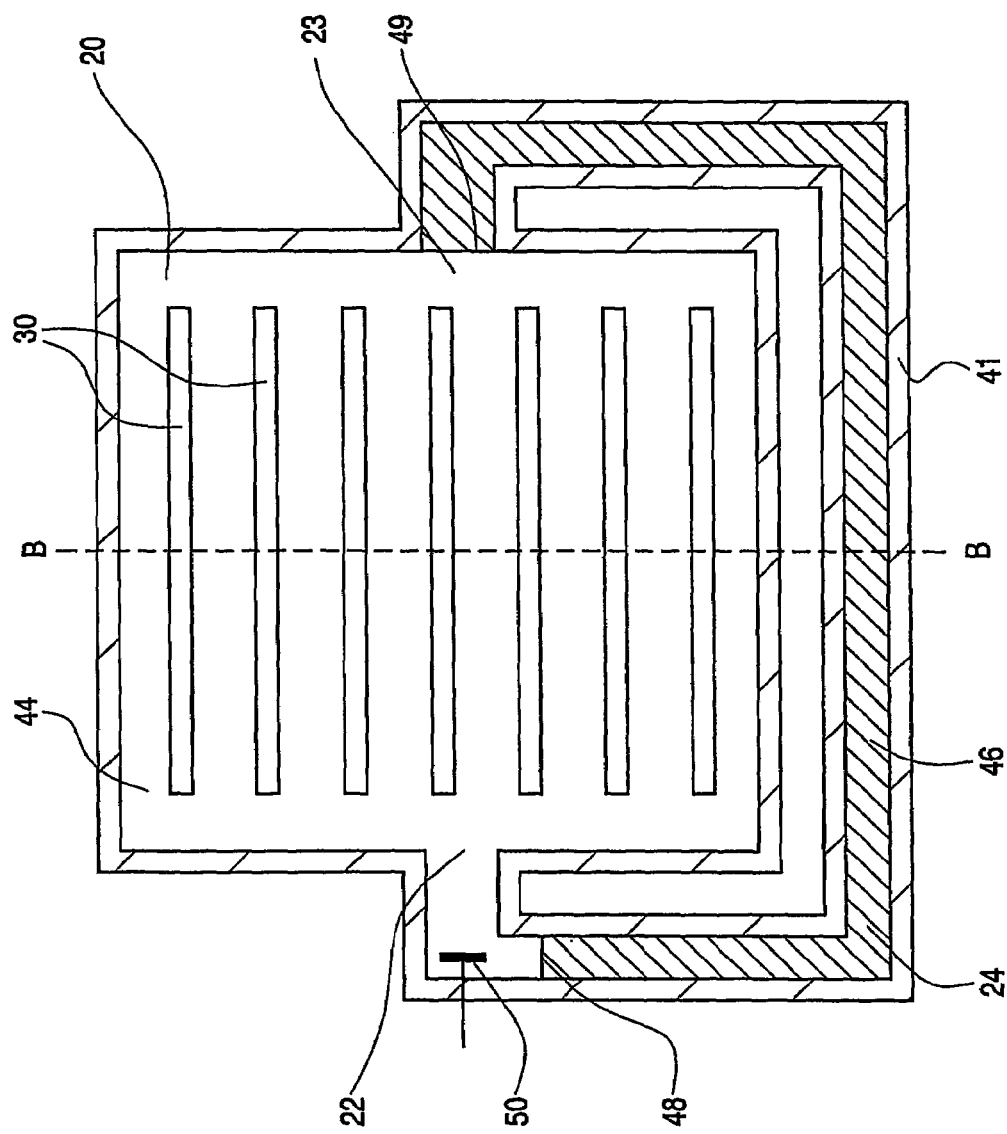

In a first discrete state of the switchable optical element, as illustrated by FIGS. 1 and 2, the first fluid 44 substantially fills the chamber 20 and a portion of the conduit 24. By substantially filling, it is meant that the first fluid lies in contact with at least most of the protrusions 30 of the face of the wavefront modifier 28. In this state, the first fluid lies in contact with at least most of the exposed surface of the hydrophobic fluid contact layer 32 in the chamber. Additionally, there is a common, third electrode 50 formed for example from a metal, located in the conduit 24 near to one opening 22 of the chamber, which lies in contact with the portion of the conduit filled by the first fluid 44 in both states. In the first discrete state of the element, the second fluid 46 substantially fills the conduit 24 except for the portion filled by the first fluid 44 which is in contact with the common, third electrode 50.

In a second discrete state of the switchable optical element, as illustrated by FIGS. 3 and 4, the first fluid 44 substantially fills the conduit 24. In this second discrete state the first fluid 44 continues to lie in contact with the common third electrowetting electrode 50 located in the previously described portion of the conduit. The first fluid 44 now lies in contact with the hydrophobic fluid contact layer 38 of the conduit. The second fluid 46 now substantially fills the chamber 20 such that the second fluid 46 lies in contact with the protrusions 30 of the face of the wavefront modifier 28 and the exposed surface of hydrophobic fluid contact layer 32 of the chamber. Additionally a portion of the conduit 24 is filled by the second fluid 46. This portion of the conduit 24 is at the opposite end to the portion in which the common, third electrode 50 is located.

The first, second and third electrodes 34, 40 and 50 form a configuration of electrowetting electrodes which together with a voltage control system (not shown) form a fluid system switch. This fluid system switch acts upon the described fluid system comprising the first and second fluids 44, 46, in order to switch between the described first and second discrete states of the switchable optical element. In the first discrete state of the element an applied voltage $V_1$ of an appropriate value is applied across the first electrowetting electrode 34 and the common, third electrode 50. The applied voltage $V_1$ provides an electrowetting force such that the switchable optical element of the present invention tends to adopt the first discrete state wherein the electrically conductive first fluid 44, moves to substantially fill the chamber 20. As a result of the applied voltage $V_1$, the hydrophobic fluid contact layer 32 of the chamber 20 temporarily becomes at least relatively hydrophilic in nature, thus aiding the preference of the first fluid 44 to substantially fill the chamber 20. It is envisaged that whilst in the first discrete state, no voltage is applied across the second electrowetting electrode 40 and the common, third electrode 50, such that the fluid contact layer in the conduit remains relatively highly hydrophobic.

In order to switch between the first discrete state and the second discrete state of the switchable optical element, the voltage control system of the fluid system switch switches off the applied voltage $V_1$ and applies a second applied voltage $V_2$ of an appropriate value across the second electrowetting electrode 40 and the common, third electrode 50.

Additionally, it is envisaged that the voltage $V_1$ applied across the first electrowetting electrode 34 and the common, third electrode 50 is switched off so that no voltage is applied across the first electrowetting electrode 34 and the common, third electrode 50.

The switchable optical element now lies in the second discrete state, in which the first fluid 44 substantially fills the conduit 24 as a result of electrowetting forces provided by the applied voltage $V_2$. With the applied voltage $V_2$ the hydrophobic fluid contact layer 38 of the conduit 24 is now at least relatively hydrophilic and tends to attract the first fluid 44. The first fluid 44 moves to fill the portion of the conduit 24 in which the common third electrode 50 is located. As earlier described, the second fluid 46 now substantially fills the chamber 20. The hydrophobic fluid contact layer 32 of the chamber 20 is now relatively highly hydrophobic and aids this arranging of the second fluid in the second discrete state.

During the transition between the first and the second discrete states of the element, as controlled by the fluid system switch, the first and second fluids 44, 46 of the fluid system flow in a circulatory manner through the fluid system, each of the fluids displacing each other. In this circulatory fluid flow during the transition from the first to the second discrete state, the first fluid 44 passes out of the chamber 20 into one end of the conduit 24 via one opening 22 of the chamber. Simultaneously the second fluid 46 passes from the other end of the conduit 24 into the chamber 20 via the other opening 23 of the chamber. During the transition, from the second to the first discrete state, an opposite circulatory fluid flow occurs.

Thus, when changing from the first discrete state to the second discrete state, the applied voltage $V_2$ across the second electrowetting electrode 40 and the common, third electrode 50 attracts the electrically conductive first fluid 44 into the chamber 20, thus displacing the electrically insulative second fluid 46 out of the chamber 20. Additionally, the hydrophobic fluid contact layer 32 of the chamber 20 repels the electrically conductive first fluid 44 out of the chamber 20 into the conduit 24. The transition from the second to the first discrete state is the reverse of the transition from the first to the second transition state in these terms.

Figure 5:
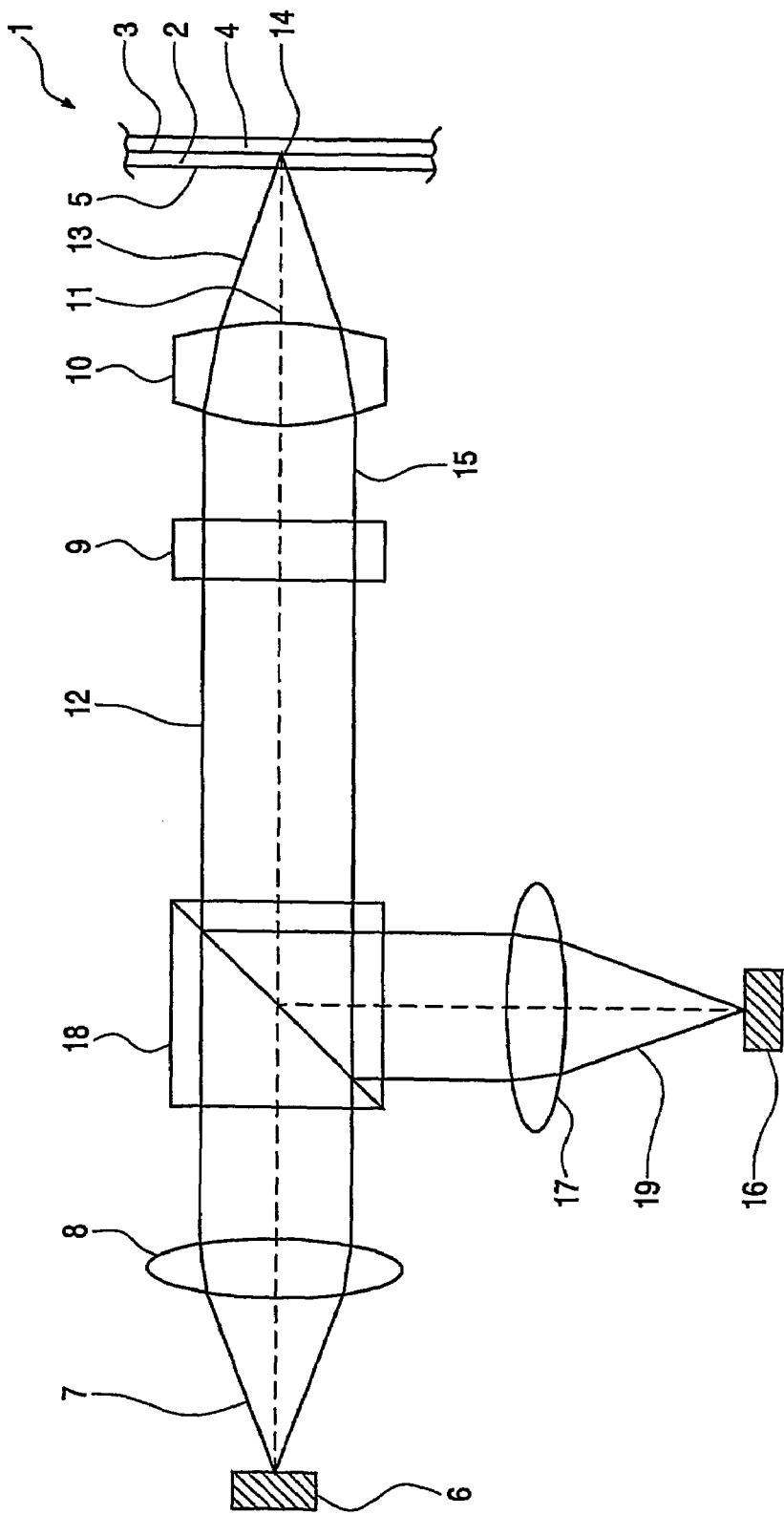
FIG. 5 shows a schematic diagram of an optical scanning device including a switchable optical element in accordance with one embodiment of the present invention.

FIG. 5 schematically illustrates an optical scanning device for scanning an information layer of an optical record carrier, in this example a disc. The optical scanning device includes a switchable optical element in accordance with an embodiment of the present invention, similar to that described above with reference to FIGS. 1 to 4.

An optical record carrier 1 comprises a transparent layer 2, on one side of which at least one information layer 3 is arranged. The carrier may comprise a plurality of information layers arranged at different depths within the side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers. Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direction of magnetization different from their surroundings, or a combination of these forms.

The scanning device includes a radiation source system 6, comprising a tunable semiconductor laser or three separate semiconductor lasers. A radiation beam 7 of a first, second or third predetermined wavelength is emitted. The first, second and third predetermined wavelengths of the radiation beam correspond to a different type of optical record carrier 1 being scanned by the optical scanning device. As an example, the first predetermined wavelength $\lambda_1$ is 405 nm, corresponding to a Blu-Ray™ disc, the second wavelength $\lambda_2$ is 650 nm for scanning a DVD and the third wavelength $\lambda_3$ is 785 nm, corresponding to a CD. The radiation beam of the predetermined wavelength is divergent and emitted towards a lens system. The lens system includes a collimator lens 8, a switchable optical element 9 in accordance with the present invention and an objective lens 10 arranged along an optical axis 11. The collimator lens 8 transforms the diverging radiation beam 7 of a predetermined wavelength emitted from the radiation source system 6 into a substantially collimated beam 12. The switchable optical element 9 of the present invention, described in further detail below, modifies a wavefront of the collimated radiation beam 12, the wavefront modification being specific to the type of record carrier being read. The objective lens 10 transforms the incident wavefront modified radiation beam 15 into a converging beam 13, having a selected numerical aperture (NA), which comes to a focal spot 14 on the information layer 3. A detection system 16, a second collimator lens 17 and a beam splitter 18 are provided in order to detect in the information carrying radiation beam 19 data signals, and control signals including focus error signals which are used to mechanically adjust the axial position of the objective lens 10.

The face of the wavefront modifier of the switchable optical element 9 is of a precise design and construction such that a predetermined wavefront modification is applied to a collimated radiation beam 12 of a specific wavelength, which is specific to the type of record carrier being scanned, when the element is in a selected one of its discrete states. Detailed descriptions now follow of further embodiments of the switchable optical element.

In one embodiment of the present invention the protrusions of the face of the wavefront modifier form a circular diffraction grating. The wavefront modifier is formed of a polycarbonate material having a refractive index of n=1.6, the first fluid is salted water with a refractive index of $n_{water}$=1.350 and the second fluid is silicone oil with a refractive index of $n_{oil}$=1.393.

The following example illustrates the design of a diffraction grating selecting zero order diffraction for the $\lambda_1$ radiation beam, and first order diffraction for the $\lambda_2$ and $\lambda_3$ radiation beams. The protrusions of the wavefront modifier are annular and form a series of zones of equal width when viewed as a radial profile of the face of the wavefront modifier. Each zone includes a number of radial subzones. The arrangement of subzones in each zone is similar, such that the steps form a regularly repeating phase structure. The height of each step is chosen such that they introduce a phase change ($\Phi$) which is an integer multiple of $2\pi$ for the $\lambda_1$ radiation beam, so as to introduce a flat wavefront modification. The appropriate heights of the steps, for the $\lambda_1$ radiation beam to undergo a phase change of $2\pi$, depend on the discrete state of the switchable optical element selected for use. The basic unit of height for the first discrete state, in which the face of the wavefront modifier is covered with the first fluid, is:

$$h_{405}^{water} = \frac{\lambda_1}{n - n_{water}} = 1.620 \ \mu m \quad (2)$$

and for the second discrete state, in which the face is covered with the second fluid, is:

$$h_{405}^{oil} = \frac{\lambda_1}{n - n_{oil}} = 1.957 \ \mu m \quad (3)$$

Table I tabulates the basic units of step height giving rise to a phase change of $2\pi$ for each of the $\lambda_1$, $\lambda_2$ and $\lambda_3$ radiation beams. Table II tabulates the phase change ($\Phi$) introduced by a step height of $h^{oil}_{405}$ or $h^{water}_{405}$ (1.620 μm) for the $\lambda_2$ and $\lambda_3$ radiation beams in each of the first and second discrete states respectively.

TABLE I

| Wavelength (nm) | $h^{oil}$ (μm) | $h^{water}$ (μm) |
|---|---|---|
| $\lambda_1 = 405$ | 1.957 | 1.620 |
| $\lambda_2 = 650$ | 3.140 | 2.600 |
| $\lambda_3 = 785$ | 3.792 | 3.140 |

TABLE II

| | $\Phi(\lambda_2, \text{oil})/2\pi$ | $\Phi(\lambda_2, \text{water})/2\pi$ | $\Phi(\lambda_3, \text{oil})/2\pi$ | $\Phi(\lambda_3, \text{water})/2\pi$ |
|---|---|---|---|---|
| $h^{oil}_{405}$ | 0.623 | 0.753 | 0.516 | 0.623 |
| $h^{water}_{405}$ | 0.516 | 0.623 | 0.427 | 0.516 |

From these tables it can be seen that when the same discrete state of the element is used for each radiation beam, phase changes of the $\lambda_3$ radiation beam are approximately $\pi$. Consequently, in that case only two substantially different phase change steps for the $\lambda_3$ radiation beam are possible, making the design of a relatively simple grating, giving rise to high efficiency in the first order diffraction, difficult. However, when different discrete states of the element are used for the three radiation beams, such a design is possible. Consider the case where for both the $\lambda_1$ and $\lambda_2$ radiation beams the element is used in the second discrete state, and for the $\lambda_3$ radiation beam the element is used in the first discrete state.

Table III tabulates the phase changes introduced by step heights of $mh^{oil}_{405}$, m being a step height integer, for the $\lambda_2$ and $\lambda_3$ radiation beams, when the element is used in the different discrete states as described.

TABLE III

| m | $\Phi(\lambda_2, \text{oil})/2\pi$ mod 1 | $\Phi(\lambda_3, \text{water})/2\pi$ mod 1 |
|---|---|---|
| 1 | 0.623 | 0.623 |
| 2 | 0.246 | 0.246 |
| 3 | 0.869 | 0.869 |
| 4 | 0.492 | 0.492 |
| 5 | 0.115 | 0.115 |
| 6 | 0.738 | 0.738 |
| 7 | 0.361 | 0.361 |
| 8 | 0.984 | 0.984 |

Table III shows that the phase changes introduced for both the $\lambda_2$ and $\lambda_3$ radiation beams are approximately the same. There are therefore eight different step heights which may all be used to introduce a similar wavefront modification into the $\lambda_2$ and $\lambda_3$ radiation beams.

A diffraction grating structure, for example of a Damman type, can be designed selecting zeroth order diffraction for the $\lambda_1$ radiation beam and approximating a sawtooth-type blazed diffraction grating for the $\lambda_2$ and $\lambda_3$ radiation beams. Since with the construction described by Table III the phase changes introduced for the $\lambda_2$ and $\lambda_3$ radiation beams are approximately the same, it is possible to design a diffraction grating structure selecting first order diffraction for both the $\lambda_2$ and $\lambda_3$ radiation beams.

Table IV sets out the profile of a diffraction grating zone, having four radial subzones, showing a high efficiency for both the $\lambda_2$ and $\lambda_3$ radiation beams.

TABLE IV

| Subzone | m | $\Phi(\lambda_2, \text{oil})/2\pi$ mod 1 | $\Phi(\lambda_3, \text{water})/2\pi$ mod 1 |
|---|---|---|---|
| 0.00–0.25 | 5 | 0.115 | 0.115 |
| 0.25–0.50 | 7 | 0.361 | 0.361 |
| 0.50–0.75 | 1 | 0.623 | 0.623 |
| 0.75–1.00 | 3 | 0.869 | 0.869 |
| Efficiency | | 81.0% | 81.0% |

Figure 6:
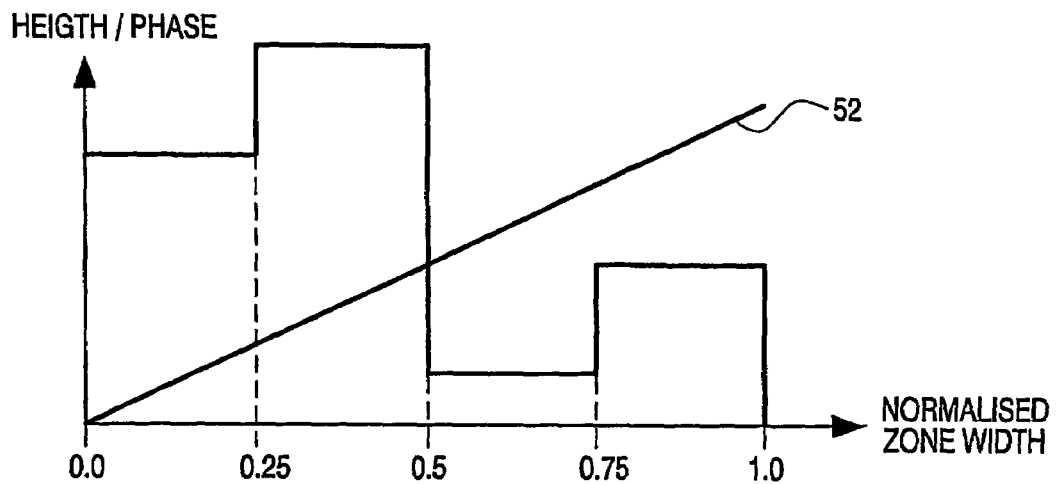
FIGS. 6, 7 and 8 schematically show height profiles of different wavefront modifiers and a wavefront modification being approximated in accordance with different embodiments of the present invention.

FIG. 6, not to scale, shows a profile of one zone of the diffraction grating of the embodiment of the present invention detailed in Table IV. In this embodiment the protrusions of the face of the wavefront modifier are concentric steps arranged radially and spaced in radial zones arranged about the optical axis of the element. The resultant wavefront modification has a stepped profile which approximates a blazed grating sawtooth profile 52 for both the $\lambda_2$ and $\lambda_3$ radiation beams. At the center of each step in the profile, the phase modification is equal to the value on the sawtooth profile 52 at that location. High efficiencies are achieved for each of the $\lambda_1$, $\lambda_2$ and $\lambda_3$ radiation beams by using the first discrete state of the element, in which the face of the wavefront modifier is covered with the first fluid, for the radiation beam $\lambda_3$, and the second discrete state, in which the face of the wavefront modifier is covered with the second fluid, for the $\lambda_1$ and $\lambda_2$ radiation beams.

Table V gives details of a further embodiment of the present invention which includes a diffraction grating employing 6 subzones in which the efficiencies for each of the $\lambda_1$, $\lambda_2$ and $\lambda_3$ radiation beams are even higher.

TABLE V

| Subzone | m | $\Phi(\lambda_2, \text{oil})/2\pi$ mod 1 | $\Phi(\lambda_3, \text{water})/2\pi$ mod 1 |
|---|---|---|---|
| 0.0000–0.1667 | 5 | 0.115 | 0.115 |
| 0.1667–0.3333 | 2 | 0.246 | 0.246 |
| 0.3333–0.5000 | 4 | 0.492 | 0.492 |
| 0.5000–0.6667 | 1 | 0.623 | 0.623 |
| 0.6667–0.8333 | 6 | 0.378 | 0.738 |
| 0.8333–1.0000 | 8 | 0.984 | 0.984 |
| Efficiency | | 87.4% | 87.4% |

Figure 7:
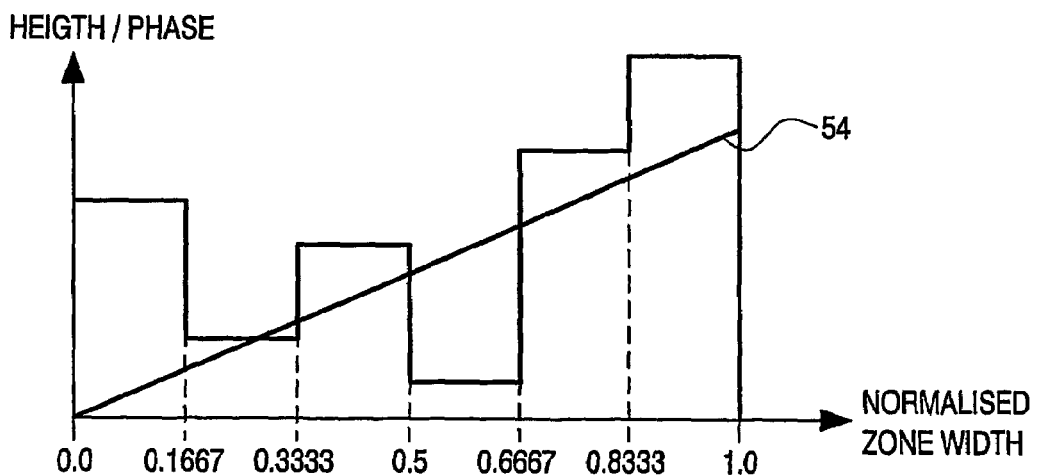

FIG. 7, not to scale, shows a profile of one zone of the diffraction grating of this further embodiment of the present invention. In a similar manner to the previous embodiment, the protrusions of the face of the wavefront modifier are concentric steps arranged radially and spaced in radial zones arrayed about the optical axis of the element. The resultant wavefront modification has a stepped profile which approximates a blazed grating sawtooth profile 54 for the $\lambda_2$ radiation beam when the element is in the second discrete state and for the $\lambda_3$ radiation beam when the element is in the first discrete state. At the center of each step of the profile, the phase modification is equal to the value on the sawtooth profile 54 at that location.

Further possible embodiments of the present invention wherein the protrusions of the face of the wavefront modifier form a diffraction grating are envisaged. These are arranged according to the general design considerations set out below.

In these embodiments a basic unit of step height h introduces a phase change of 0 or an integral multiple of $2\pi$ to a radiation beam of a wavelength $\lambda_a$ and the same, or at least a similar, phase change for the other two radiation beams of wavelengths $\lambda_b$ and $\lambda_c$. Let $n_a$ be the refractive index of the first fluid covering the face of the wavefront modifier in the first discrete state, $n_b$ be the refractive index of the second fluid covering the face of the wavefront modifier in the second discrete state and n be the refractive index of the wavefront modifier. In order that a step height h introduces at least approximately the same phase change for the two radiation beams of wavelength $\lambda_b$ and $\lambda_c$:

$$\frac{\lambda_b}{n - n_a} \approx \frac{\lambda_c}{n - n_b} \quad (4)$$

From this it follows that $n_b$ is substantially equal to (preferably within 0.05, more preferably within 0.025):

$$n_b = n + \frac{\lambda_c}{\lambda_b}(n_a - n) \quad (5)$$

Figure 8:
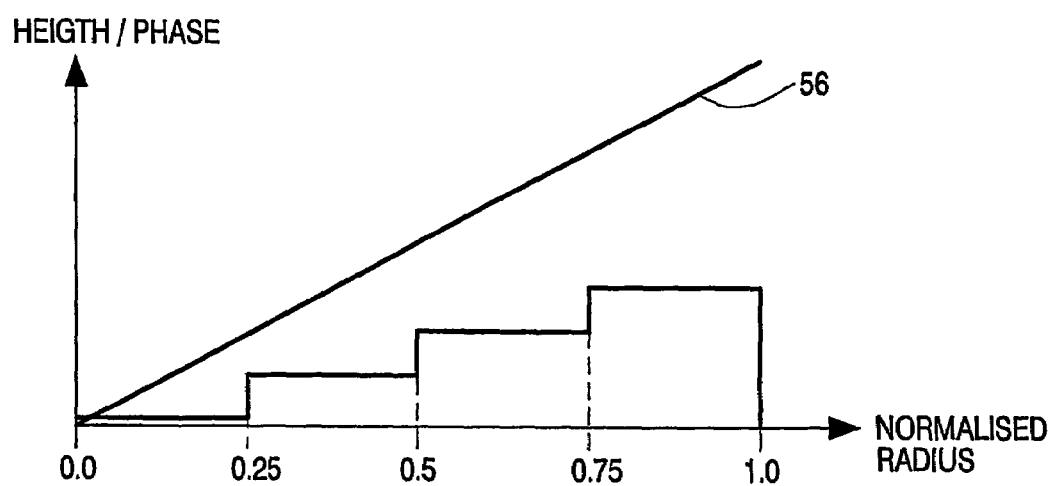

FIG. 8 shows, not to scale, a profile of the diffraction grating in accordance with a farther embodiment of the present invention. In a similar fashion to the previous embodiment, the stepped protrusions of the face of the wavefront modifier are concentric steps arranged radially and spaced in radial zones arranged about the optical axis as detailed by Table VI. In this embodiment the refractive index of the second fluid matches the refractive index of the material from which the wavefront modifier is formed. For example the wavefront modifier material, for example a cyclic olefin copolymer (COC) has a refractive index of n=1.535, the first fluid, for example salted water, has a refractive index of $n_{water}$=1.350 and the second fluid, for example oil, has a refractive index of n=1.535. The face of the wavefront modifier is covered with the second fluid for $\lambda_1$ and $\lambda_2$, and the face is covered by the first fluid for $\lambda_3$. The binary steps of the diffraction grating of the face of the wavefront modifier are therefore invisible for $\lambda_1$ and $\lambda_2$ radiation beams, and introduce a flat wavefront modification. The wavefront modification for the $\lambda_3$ radiation beam has a stepped profile which approximates a blazed grating sawtooth profile 56 when the face of the wavefront modifier is covered by the first fluid. At the center of each step of the profile, the phase modification is equal to the value on the sawtooth profile 56 at that location.

TABLE VI

| Subzone | h [μm] | $\Phi(\lambda_3, \text{water})/2\pi \mod 1$ |
|---|---|---|
| 0.00–0.25 | 0.530 | 0.125 |
| 0.25–0.50 | 1.591 | 0.375 |
| 0.50–0.75 | 2.652 | 0.625 |
| 0.75–1.00 | 3.713 | 0.875 |
| Efficiency | 81.1% | 81.1% |

FIGS. 9 to 12 schematically show a further embodiment of switchable optical element of the present invention, suitable for including in the optical scanning device as described earlier with reference to FIG. 5. Many features of this embodiment of the present invention are similar to features of the previous embodiment of the present invention described using FIGS. 1 to 4. These features are referenced herein with the same reference numerals, each numeral being incremented by 100, and previous descriptions of these elements should be taken to apply here.

Figures 9, 10:
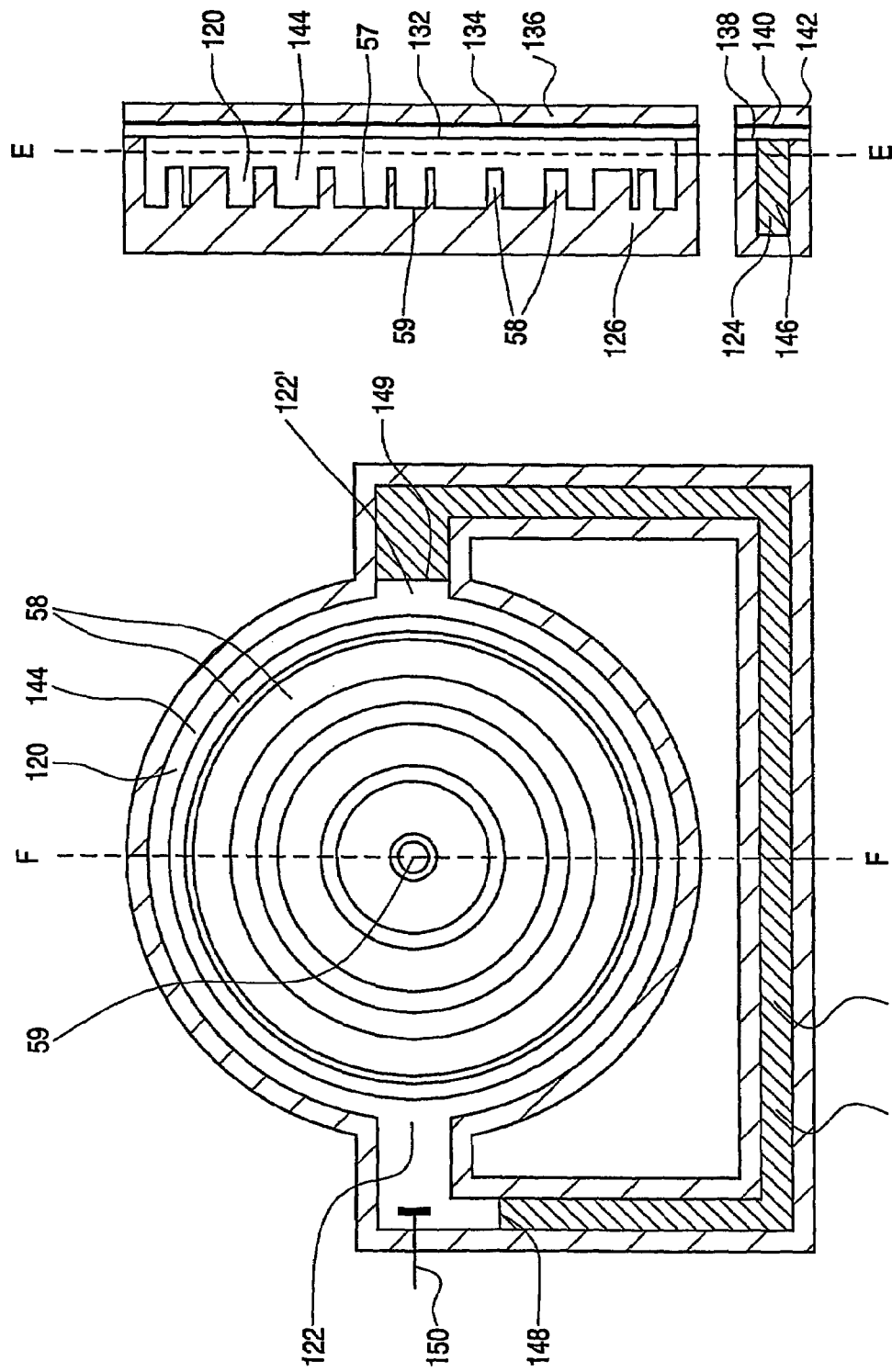
FIGS. 9 and 10 show schematic cross-sections, along lines E-E and F-F respectively, of a switchable optical element according to a further embodiment of the invention, when in a first discrete state.
Figure 12:
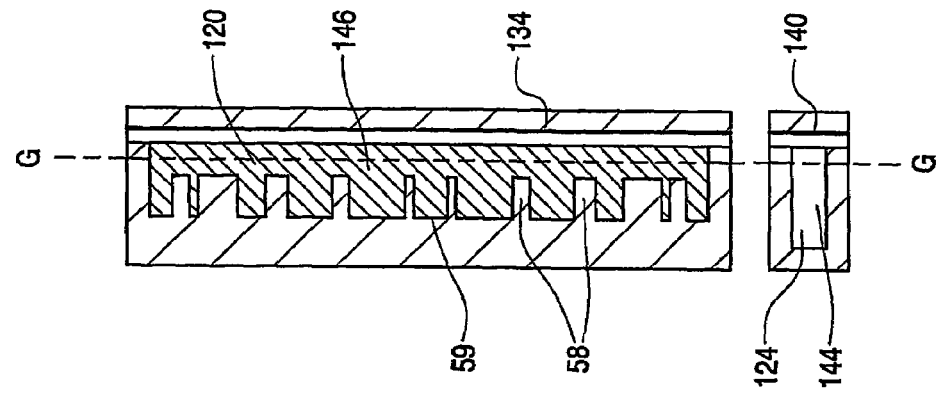
FIGS. 11 and 12 show schematic cross-sections, along lines G-G and F-F respectively, of the switchable optical element shown in FIGS. 9 and 10, when in a second discrete state.
Figure 11:
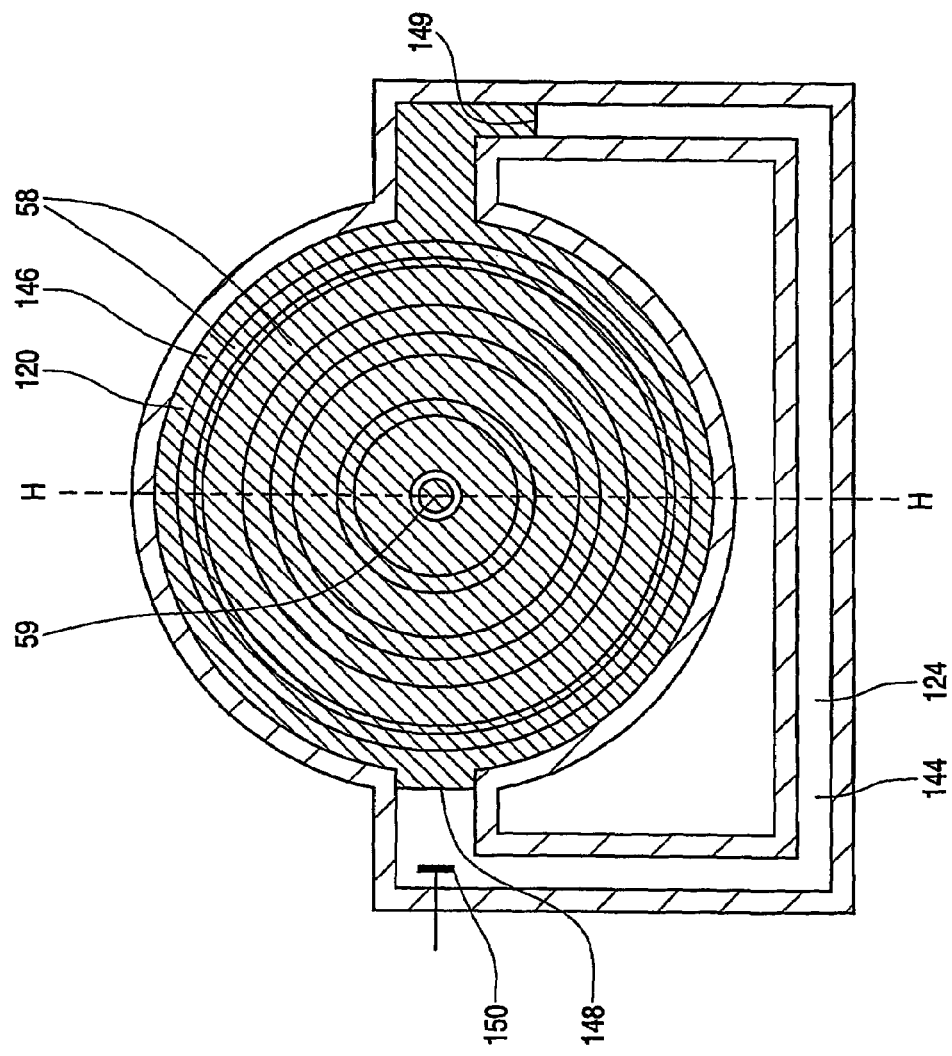

In a similar manner to the earlier embodiment described using FIGS. 2 to 5, the face 57 of the wavefront modifier comprises protrusions 58 which in this embodiment form a series of concentric circular steps arranged about a centrepoint 59 lying at a radius of zero of the face 57. When viewed in cross-sectional profile, as shown in FIGS. 10 and 12, the protrusions 58 are steps arranged in a non-periodic structure (NPS), in that from the centrepoint 59 the protrusions are arranged in the radial direction such that the protrusions are not of a regularly repeating pattern spacing. FIGS. 10 and 12 show an NPS schematically, with the protrusions 58 having an equal height. However, generally the protrusions will be of different heights to each other, with the heights of each protrusion being related by a common basic unit of step height. Also, the heights of the protrusions are exaggerated; in preferred embodiments the heights are of the order of 1 μm and the distances between the protrusions are of the order of 100 μm.

In a similar manner to the previous embodiment of the present invention described using FIGS. 1 to 4, the switchable optical element is switchable between two discrete states, in which the first fluid 144 and the second fluid 146 are differently arranged. In the first discrete state, shown in FIGS. 9 and 10, an applied voltage $V_3$ is applied across the first electrowetting electrode 134 and the common, third electrode 150. The value of this applied voltage $V_3$ is chosen to be of a value appropriate to cause switching of the element from the second discrete state to the first discrete state. No voltage is applied across the second electrowetting electrode 140 and the common, third electrode 150. In the second discrete state of this embodiment of the switchable optical element, shown by FIGS. 11 and 12, an applied voltage $V_4$ is applied across the second electrowetting electrode 140 and the common, third electrode 150. The value of this applied voltage $V_4$ is chosen to be of a value appropriate to cause switching of the element from the first discrete state to the second discrete state. No voltage is applied across the first electrowetting electrode 134 and the common, third electrode 150.

A description now follows of further embodiments of the switchable optical element, in which the face of the wavefront modifier is of a non-periodic phase structure (NPS). The specific structure of the face of the wavefront modifier in each of the further embodiments to be described corresponds to a different desired predetermined wavefront modification on a plurality of radiation beams of different predetermined wavelengths, each modification being specific to a different type of record carrier being scanned.

In a further embodiment of the present invention in which the switchable optical element includes an NPS, the wavefront modifier is formed of a polycarbonate material having a refractive index of n=1.6, the first fluid is salted water with a refractive index of 1.350 and the second fluid is silicone oil with a refractive index of 1.4. Three different radiation beams are used all of different wavelengths $\lambda_1$=405 nm, $\lambda_2$=650 nm and $\lambda_3$=785 nm.

The following example illustrates the design of an NPS providing a flat wavefront modification for the $\lambda_1$ and $\lambda_2$ radiation beams and providing an approximately spherical aberration wavefront modification for the $\lambda_3$ radiation beam. The protrusions on the face of the wavefront modifier are shaped as steps such that they introduce a phase change of $2\pi$, or an integer multiple thereof, for the $\lambda_1$ radiation beam. The basic unit of height of the steps of the NPS, for the $\lambda_1$ radiation beam to undergo a phase change of $2\pi$, depends on the discrete state of the element selected for use. The basic unit of height for the first discrete state, in which the face of the wavefront modifier is covered by the first fluid, is:

$$h_{405}^{water} = \frac{\lambda_1}{n - n_{water}} = 1.620 \ \mu m \tag{6}$$

and for the second discrete state, in which the face is covered by the second fluid, is:

$$h_{405}^{oil} = \frac{\lambda_1}{n - n_{oil}} = 2.025 \ \mu m \tag{7}$$

Table VII tabulates the step heights giving rise to a phase change of $2\pi$ for each of the $\lambda_1, \lambda_2, \lambda_3$ radiation beams. Table VIII tabulates the phase change ($\Phi$) introduced by a step height of $h^{oil}_{405}$ (2.025 µm) or $h^{water}_{405}$ (1.620 µm) for the $\lambda_2$ and $\lambda_3$ radiation beams in each of the first and second discrete states respectively.

TABLE VII

| Wavelength (nm) | $h^{oil}$ (µm) | $h^{water}$ (µm) |
|---|---|---|
| $\lambda_1 = 405$ | 2.025 | 1.620 |
| $\lambda_2 = 650$ | 3.250 | 2.600 |
| $\lambda_3 = 785$ | 3.925 | 3.140 |

TABLE VIII

| | $\Phi(\lambda_2, \text{oil})/2\pi$ | $\Phi(\lambda_2, \text{water})/2\pi$ | $\Phi(\lambda_3, \text{oil})/2\pi$ | $\Phi(\lambda_3, \text{water})/2\pi$ |
|---|---|---|---|---|
| $h^{oil}_{405}$ | 0.623 | 0.779 | 0.516 | 0.645 |
| $h^{water}_{405}$ | 0.498 | 0.623 | 0.413 | 0.516 |

From these tables it can be seen that when the same discrete state of the element is used for each, phase change jumps of the $\lambda_3$ radiation beam are approximately $\pi$. Consequently, in that case only two significantly different phase changes for the $\lambda_3$ radiation beam are possible, making the design of a relatively simple NPS, giving rise to an at least approximately spherical wavefront modification for the $\lambda_3$ radiation beam, difficult. However, when different discrete states of the element are used for the three radiation beams, such a design is possible. Consider the case where for the $\lambda_1$ radiation beam the element is used in the first discrete state, and for both the $\lambda_2$ and $\lambda_3$ radiation beams the element is used in the second discrete state.

Table IX tabulates the phase changes introduced by step heights of $mh^{water}_{405}$, m being a step height integer, for the $\lambda_2$ and $\lambda_3$ radiation beams, when the element is used in the second discrete state.

TABLE IX

| m | $\Phi(\lambda_2, \text{oil})/2\pi \mod 1$ | $\Phi(\lambda_3, \text{oil})/2\pi \mod 1$ |
|---|---|---|
| 1 | 0.498 | 0.413 |
| 2 | 0.996 | 0.826 |
| 3 | 0.494 | 0.239 |
| 4 | 0.992 | 0.652 |
| 5 | 0.490 | 0.065 |
| 6 | 0.988 | 0.478 |
| 7 | 0.486 | 0.891 |
| 8 | 0.984 | 0.304 |
| 9 | 0.482 | 0.717 |
| 10 | 0.980 | 0.130 |
| 11 | 0.478 | 0.543 |
| 12 | 0.976 | 0.956 |

Table IX shows that the phase changes introduced for the $\lambda_1$ and $\lambda_2$ radiation beams, for even values of m, are approximately the same. There are therefore six different step heights which may be used to introduce a similar wavefront modification into the $\lambda_1$ and $\lambda_2$ radiation beams.

Table X gives the heights and widths of steps of an NPS having five radial zones from a radial centrepoint of the NPS. In the second discrete state, the NPS produces an approximately flat wavefront modification for the $\lambda_2$ radiation beam and approximates wavefront modification including both defocus and spherical aberration for the $\lambda_3$ radiation beam.

TABLE X

| Zones [mm] | h [µm] | m | $\Phi(\lambda_2, p_e)$ | $\Phi(\lambda_3, p_e)$ |
|---|---|---|---|---|
| 0.00–0.40 | 19.440 | 12 | −0.1508 | −0.276 |
| 0.40–0.59 | 16.200 | 10 | −0.1257 | 0.817 |
| 0.59–1.10 | 12.960 | 8 | −0.1005 | 1.910 |
| 1.10–1.20 | 16.200 | 10 | −0.1257 | 0.817 |
| 1.20–1.26 | 19.440 | 12 | −0.1508 | −0.276 |

Figure 13:
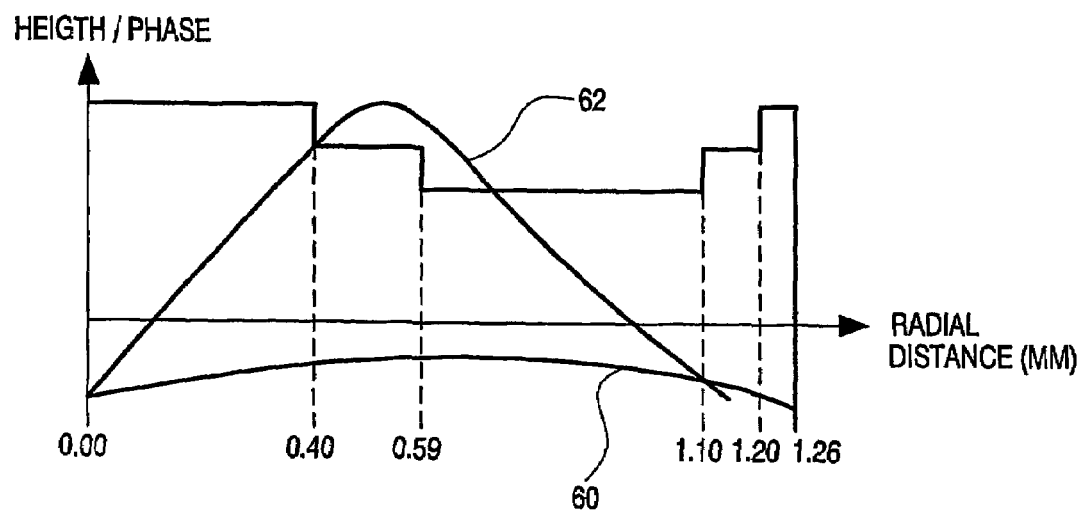
FIGS. 13 and 14 show schematic height profiles of a wavefront modifier and a wavefront modification being approximated for each radiation beam in accordance with different embodiments of the present invention.

FIG. 13, not to scale, shows a profile of the NPS detailed in Table X and shows the relative heights of the NPS steps, which vary according to the radial distance from the optical axis of the element (zero radius). Additionally shown is the resultant approximately flat wavefront modification 60 of the $\lambda_2$ radiation beam and the resultant wavefront modification has a stepped profile approximating a defocus combined with spherical aberration profile 62 of the $\lambda_3$ radiation beam, both wavefront modifications being performed with the element in the second discrete state. At the center of each step of the profile, the phase modification is equal to the value on the profile 62 at that location.

Due to the extra design freedom introduced by being able to arrange the element in different discrete states a simple NPS can be designed having only relatively small height differences between individual steps of the NPS phase structure, thus making the manufacturing process of the face of the wavefront modifier significantly easier.

In a further embodiment of the present invention in which the switchable optical element includes an NPS, the wavefront modifier is formed of a polycarbonate material having a refractive index of n=1.6, the first fluid is salted water having a refractive index of n=71.344 and the second fluid is silicone oil having a refractive index of n=1.393. In this example, three radiation beams are used, with wavelengths $\lambda_1$=405 nm, $\lambda_2$=650 nm and $\lambda_3$=785 nm.

The basic unit of height of the steps of the NPS, for the $\lambda_1$ radiation beam to undergo a phase change of $2\pi$, depends on the discrete state of the element selected for use. The basic unit of height for the first discrete state, in which the face of the wavefront modifier is covered by the first fluid, is:

$$h_{405}^{water} = \frac{\lambda_1}{n - n_{water}} = 1.582 \; \mu m \qquad (8)$$

and for the second discrete state, in which the face is covered by the second fluid, is:

$$h_{405}^{oil} = \frac{\lambda_1}{n - n_{oil}} = 1.957 \; \mu m \qquad (9)$$

Table XI tabulates the step heights giving rise to a phase change of $2\pi$ for each discrete state. Table XII tabulates the phase change ($\Phi$) introduced by a step of $h^{oil}_{405}$ (1.957 μm) or $h^{water}_{405}$ (1.582 μm) for the $\lambda_2$ and $\lambda_3$ radiation beams is given.

TABLE XI

| Wavelength (nm) | $h^{oil}$ (μm) | $h^{water}$ (μm) |
|---|---|---|
| 405 | 1.957 | 1.582 |
| 650 | 3.140 | 2.539 |
| 785 | 3.792 | 3.066 |

TABLE XII

| | $\Phi(\lambda_2, oil)/2\pi$ | $\Phi(\lambda_2, water)/2\pi$ | $\Phi(\lambda_3, oil)/2\pi$ | $\Phi(\lambda_3, water)/2\pi$ |
|---|---|---|---|---|
| $h^{oil}_{405}$ | 0.623 | 0.771 | 0.516 | 0.639 |
| $h^{water}_{405}$ | 0.504 | 0.623 | 0.417 | 0.516 |

From these tables it can be seen that when the element is in the same discrete state for each radiation beam the phase change wavefront modification differences for the $\lambda_3$ radiation beam are approximately $\pi$. Consequently, in that case only two significantly different phase changes are possible, making the design of a simple NPS giving rise to an at least approximately spherical wavefront modification for the $\lambda_3$ radiation beam, difficult. However, when the element is used in different discrete states for the three radiation beams, such a simple design is possible. Consider the case, where for both the $\lambda_1$ and $\lambda_2$ radiation beams the element is used in the second discrete state and for the $\lambda_3$ radiation beam the element is used in the first discrete state.

Table XIII tabulates the phase changes introduced by step heights of integer $mh^{oil}_{405}$ for the $\lambda_2$ and $\lambda_3$ radiation beams, m being a step height integer, when the element is used in the different discrete states as described.

TABLE XIII

| m | $\Phi(\lambda_2, oil)/2\pi$ mod 1 | $\Phi(\lambda_3, water)/2\pi$ mod 1 |
|---|---|---|
| −1 | 0.377 | 0.361 |
| 0 | 0.000 | 0.000 |
| 1 | 0.623 | 0.639 |
| 2 | 0.246 | 0.278 |
| 3 | 0.869 | 0.917 |
| 4 | 0.492 | 0.556 |
| 5 | 0.115 | 0.195 |
| 6 | 0.738 | 0.834 |
| 7 | 0.361 | 0.473 |

TABLE XIII-continued

| m | $\Phi(\lambda_2, oil)/2\pi$ mod 1 | $\Phi(\lambda_3, water)/2\pi$ mod 1 |
|---|---|---|
| 8 | 0.984 | 0.112 |
| 9 | 0.607 | 0.751 |

Table XIII shows that the phase changes introduced for the $\lambda_2$ and $\lambda_3$ radiation beams are approximately the same. The various step heights provide at least eight significantly different phase change possibilities.

Table XIV below gives details of an NPS having 23 radial zones providing a wavefront modification which approximates both defocus and spherical aberration for both the $\lambda_2$ and $\lambda_3$ radiation beams.

TABLE XIV

| Zones [mm] | h [μm] | m | $\Phi(\lambda_2, p_e)$ | $\Phi(\lambda_3, p_e)$ |
|---|---|---|---|---|
| 0.000–0.230 | 0.000 | 0 | 0.000 | 0.000 |
| 0.230–0.320 | 4.050 | 5 | 0.723 | 1.225 |
| 0.320–0.400 | 1.620 | 2 | 1.546 | 1.747 |
| 0.400–0.470 | 5.670 | 7 | 2.268 | 2.972 |
| 0.470–0.530 | 3.240 | 4 | 3.091 | 3.493 |
| 0.530–0.580 | 0.810 | 1 | 3.914 | 4.015 |
| 0.580–0.640 | 4.860 | 6 | 4.637 | 5.240 |
| 0.640–0.690 | 2.430 | 3 | 5.460 | 5.762 |
| 0.690–0.750 | 6.480 | 8 | 6.183 | 6.987 |
| 0.750–0.820 | 4.050 | 5 | 7.006 | 7.508 |
| 0.820–0.900 | 1.620 | 2 | 7.829 | 8.030 |
| 0.900–1.150 | −0.810 | −1 | 8.652 | 8.551 |
| 1.150–1.205 | 1.620 | 2 | 7.829 | — |
| 1.205–1.240 | 4.050 | 5 | 7.006 | — |
| 1.240–1.270 | 6.480 | 8 | 6.183 | — |
| 1.270–1.295 | 2.430 | 3 | 5.460 | — |
| 1.295–1.315 | 4.860 | 6 | 4.637 | — |
| 1.315–1.335 | 0.810 | 1 | 3.914 | — |
| 1.335–1.352 | 3.240 | 4 | 3.091 | — |
| 1.352–1.368 | 5.670 | 7 | 2.268 | — |
| 1.368–1.380 | 1.620 | 2 | 1.546 | — |
| 1.380–1.395 | 4.050 | 5 | 0.723 | — |
| 1.395–1.325 | 0.000 | 3 | −0.823 | — |

Figure 14:
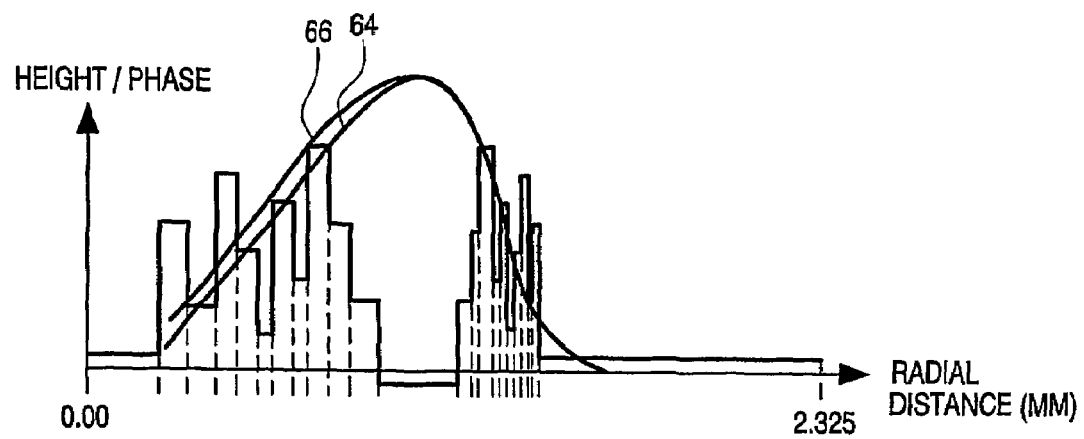
Figure 16:
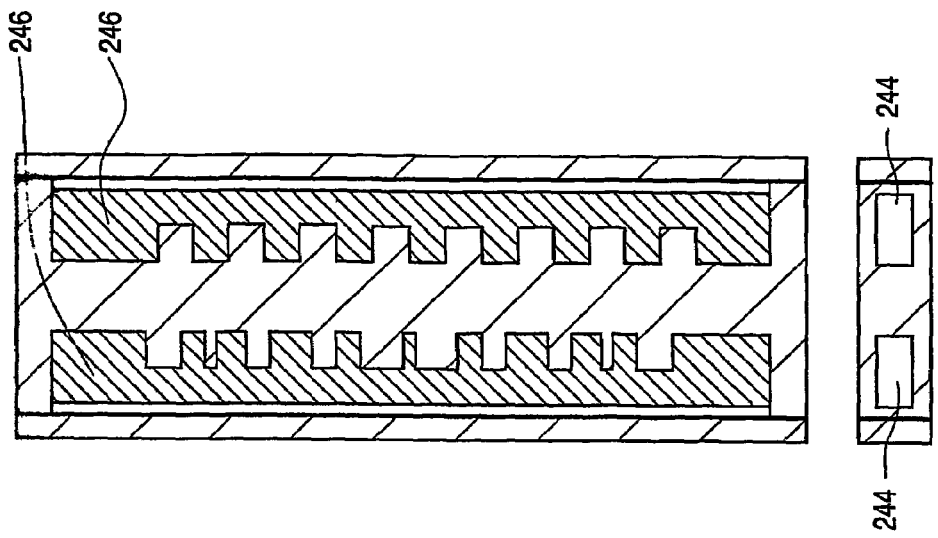
FIGS. 15 to 18 show schematic cross-sections of a switchable optical element in accordance with a further embodiment of the present invention, when arranged in four different discrete states.
Figure 15:
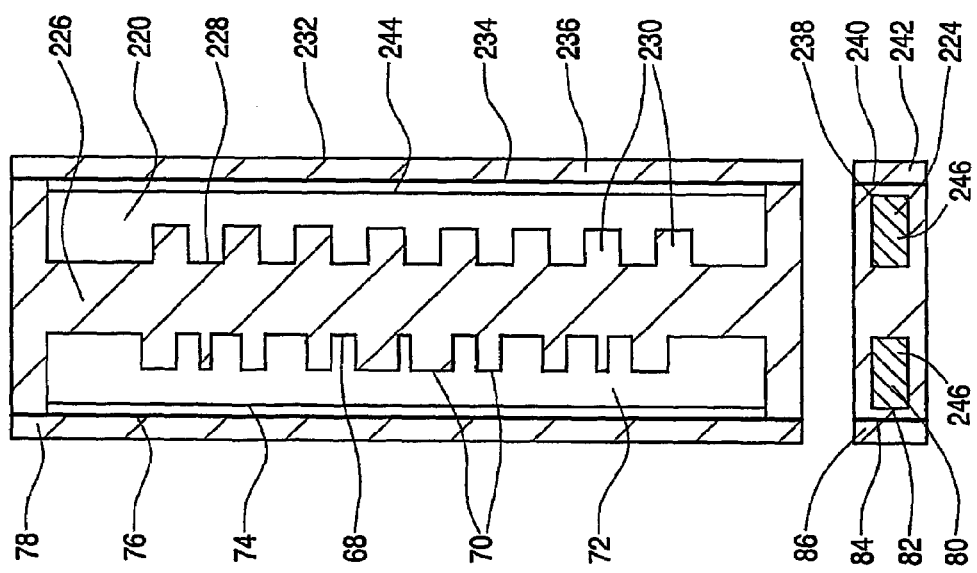
Figure 17:
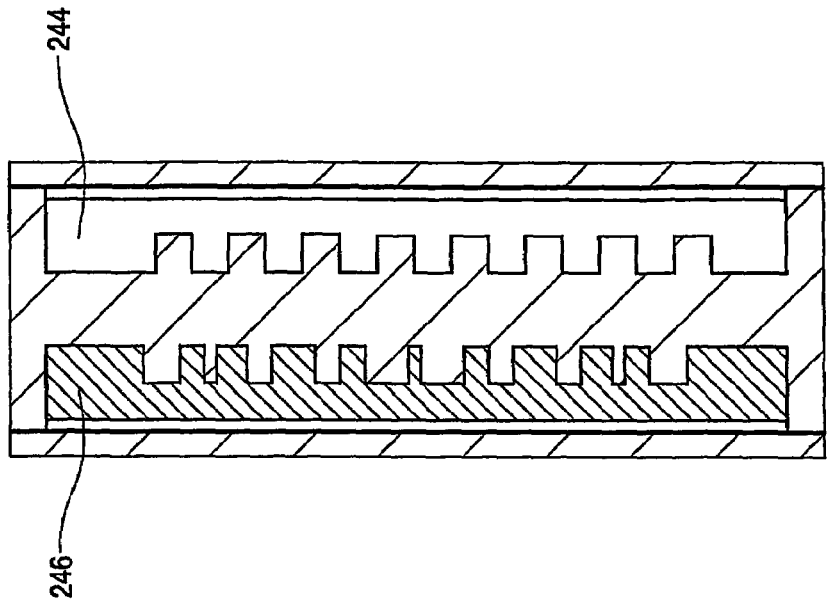
Figure 18:
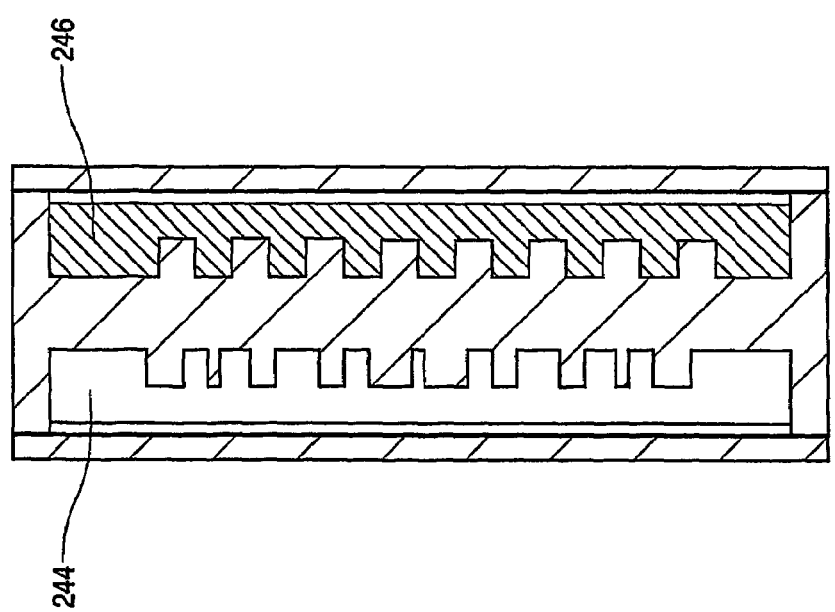

FIG. 14, not to scale, shows a profile of the NPS detailed in Table XIV and shows the relative heights of the NPS steps, which vary according to the radial distance from the optical axis of the element (zero radius). For both the $\lambda_2$ and $\lambda_3$ radiation beams, the resultant wavefront modification has a stepped profile each approximating a different defocus combined with spherical aberration profile 64, 66 with the element in the second discrete state for $\lambda_2$ and in the first discrete state for $\lambda_3$. At the center of each step of the profile, the phase modification is equal to the value on the respective profile 64, 66 at that location. It should be noted that at radial zones further from the center of the NPS, the different wavefront modifications for both the $\lambda_2$ and $\lambda_3$ radiation beams tend to merge such that they are approximately the same.

Further possible embodiments of switchable NPS are envisaged. These are arranged according to the general design considerations set out below.

In these embodiments a basic unit of step height h introduces a phase change of 0 or an integral multiple of $2\pi$ for a radiation beam of a wavelength $\lambda_a$ and the same, or at least similar, phase change for the other two radiation beams with wavelengths $\lambda_b$ and $\lambda_c$. Let $n_a$ be the refractive index of the fluid covering the face of the wavefront modifier in the first discrete state of the element, $n_b$ be the refractive index of the fluid covering the face of the wavefront modifier in the second discrete state and n be the refractive index of the wavefront modifier. In order that a step height h introduces at least approximately the same phase change for the two radiation beams of wavelength $\lambda_b$ and $\lambda_c$:

$$\frac{\lambda_b}{n - n_a} \approx \frac{\lambda_c}{n - n_b} \qquad (10)$$

From this it follows that $n_b$ is substantially equal to (preferably within 0.05, more preferably within 0.025):

$$n_b = n + \frac{\lambda_c}{\lambda_b}(n_a - n) \qquad (11)$$

FIGS. 15, 16, 17 and 18 show a further embodiment of the present invention when in first, second, third and fourth discrete states respectively. Each of FIGS. 15 to 18 is a schematic side view cross-sections. Elements of this embodiment of the present invention are similar to features of previous embodiments of the present invention as illustrated by FIGS. 1 to 4 and FIGS. 9 to 12. These elements are therefore referenced herein by the same numerals, incremented by 200, and previous descriptions should be taken to apply here also.

In addition to the face 228 of the wavefront modifier 226, the wavefront modifier 226 of this embodiment of the present invention has a second face 68. Similarly to the first face of the wavefront modifier 228 the second face 68 of the wavefront modifier comprises a solid relief structure comprising protrusions 70. When viewed in profile, these protrusions 70 are arranged across the surface of the second face 68 of the wavefront modifier. The protrusions 70 in this embodiment are steps which form a series of concentric and circular steps arranged about a centrepoint of the face 68 of the wavefront modifier, the widths of the steps being different to each other. This arrangement of protrusions forms an NPS in a similar manner to the previous embodiment described using FIGS. 9 to 12. Alternatively the protrusions 70 can form a diffraction grating, in a similar manner to an embodiment of the present invention described above.

As described for previous embodiments of the present invention, the arrangement of protrusions 70 is designed to perform a predetermined wavefront modification upon a given radiation beam of a specific wavelength and in a selected discrete state of the element.

The second face 68 of the wavefront modifier 226 is exposed to the interior of a second chamber 72 of a similar construction to the first chamber 220. It includes a transparent cover plate 78 covered by a hydrophobic fluid contact layer 74, which is preferably transparent and formed of AF1600™, one surface of which is exposed to the interior of the second chamber 72. Lying between the cover plate 78 and the hydrophobic fluid contact layer 74 is a fourth electrowetting electrode 76. This fourth electrowetting electrode 76 is preferably formed of a transparent electrically conducting material, for example indium tin oxide (ITO). Similarly to previous embodiments of the present invention the fourth electrowetting electrode 76 has an operative area which completely overlaps with the arrangement of protrusions 70 of the second face 68 of the wavefront modifier 226. The hydrophobic fluid contact layer 74 preferably also overlaps with the arrangement of protrusions 70 of the second face 68.

This embodiment of the present invention further comprises a second conduit 80 of a similar construction to the conduit 224, as described for previous embodiments. The conduit 80 is formed by walls and a cover plate 80, which is covered by a hydrophobic fluid contact layer 82 and a fifth electrowetting electrode 84, and the conduit includes a sixth common electrode (not shown).

The second chamber 72 is fluidly connected to the second conduit 80, in a similar manner to the fluid connection of the first chamber 220 and the first conduit 224, such that a fluid tight enclosure results which holds a second fluid system. In this embodiment of the present invention the second fluid system is of a similar nature to the fluid system enclosed by the first chamber 220 and the first conduit 224, and comprises a first fluid 244 and a second fluid 246. The first fluid 244 and the second fluid 246 are similar to the first and second fluids of previous embodiments of the present invention and lie in contact with each other at two fluid menisci (not shown), similar to the fluid menisci 48, 49 of the first fluid system. Alternatively, the two fluids of the second fluid system can comprise a fluid or fluids which is or are different to the first fluid and the second fluid 244, 246.

By applying different voltages to arrange the first and second fluids 244, 246 within the two chambers 220, 72 and the two conduits 224, 80, the switchable optical element of the present invention can be arranged in four discrete states, shown in FIGS. 15, 16, 17 and 18 respectively. The arrangement of the first and second fluids 244, 246 in these discrete states is of a similar nature to the first and second discrete states of the optical element for previous embodiments of the present invention.

In a similar manner to previous embodiments of the present invention the first, second, fourth and fifth electrowetting electrodes 234, 240, 76, 84, and the common, third and sixth electrodes (not shown) respectively, together form a configuration of electrowetting electrodes which together with a voltage control system (not shown) form a fluid system switch. This fluid system switch enables the element of this embodiment of the present invention to be arranged in the different discrete states by application of the necessary voltages in order to arrange the first and second fluids 244, 246 in accordance with the selected discrete state. Similarly to previous embodiments of the present invention, the fluids of the two fluid systems of the element flow in a circulatory manner during a transition between the discrete states.

In this embodiment of the present invention the two chambers 220, 72 are not interconnected between each other and two separate fluid systems are used. It is envisaged as a further embodiment of the present invention, a single fluid system is arranged to flow, in a circulatory manner between the two chambers 220, 72, rather than into separate conduits. Thus, in this embodiment, each chamber functions as a conduit for the other chamber.

Note that, in the above embodiments, variations of refractive index with wavelength have been ignored. However, such variations are generally relatively small. Where such variations are not negligible, the effect can be taken into account by appropriate modifications to the design of the wavefront modifier.

The arrangements described in the above embodiments provide for a reduction in the wavefront aberrations in at least one of three different radiation beams, of different wavelength, scanning different types of optical record carrier using a single objective lens system. Without the switchable optical element at least one of the wavefront aberrations, taken as a root mean square (RMS) value would fall above the acceptable limit of 70 m$\lambda$, whereas use of the switchable optical element reduces such aberration to less than 70 m$\lambda$.

The above embodiments are to be understood as illustrative examples of the invention. Further embodiments of the invention are envisaged.

In a further envisaged embodiment of the present invention, the wavefront modifier is formed of a birefringent material. In this embodiment the predetermined wavefront modification performed upon a given radiation beam of a certain wavelength is also dependent upon a state of polarization of the radiation beam. Thus different predetermined wavefront modifications can be performed on the radiation beam having different states of polarization.

In a further envisaged embodiment of the present invention one of the fluids of the fluid system of the element comprises a liquid crystal material. In this case at least one surface exposed to the interior of the chamber must comprise an alignment layer. In this embodiment, wherein the other fluid of the fluid system is not a liquid crystal material, it is possible to switch between two discrete states of the element providing either a non-birefringent cell or a continuously variable liquid crystal cell, for performing a wavefront modification upon a given radiation beam.

As a further envisaged embodiment of the present invention the heights of the protrusions on the face of the wavefront modifier are selected such that, in a selected discrete state, the wavefront modification for two of the radiation beams of different wavelengths is an integral multiple of $2\pi$. This results in a flat wavefront modification. A wavefront modification for the remaining radiation beam is different and determined by the height of the protrusions and the selected discrete state to be used.

In a further embodiment of the present invention, the heights of the protrusions on the face of the wavefront modifier are selected such that, in a selected discrete state, the wavefront modification for all three radiation beams is an integral multiple of $2\pi$. This results in a flat wavefront modification for all three radiation beams. However, by switching the discrete state for one radiation beam, a selected wavefront modification results.

In various of the described embodiment of the present invention, the refractive index of either the first fluid or the second fluid may be selected to be equal to the refractive index of the material from which the wavefront modifier is formed thus creating a refractive index difference of zero across the face of the wavefront modifier. As a result, in the appropriate discrete state of the element where the said refractive index difference is zero, a flat wavefront modification is performed on at least one radiation beam of a certain wavelength. When the element is in the alternative discrete state wherein the refractive index difference is no longer zero, a different wavefront modification is performed on the radiation beams of different wavelengths.

In the above described embodiments, each fluid is in the form of a liquid. Alternatively, the oil component may be replaced with a gas or vapor component.

In the described embodiments, electrowetting electrodes and hydrophobic fluid contact layers are arranged on a surface adjacent the face of the wavefront modifier. Alternatively, or in addition, corresponding electrowetting electrodes and hydrophobic fluid contact layers may be formed on at least part of the face of the wavefront modifier. This will aid removal of one fluid from, and positioning of the other fluid on, the face of the wavefront modifier during switching. Furthermore, whilst an electrode and hydrophobic fluid contact layer is formed on only one wall of the conduits of the above described embodiments, such means may be formed on two, three, or all walls of the conduits, in order to aid correct fluid flow during switching.

In the above embodiments, the element is arranged for circulatory fluid flow during switching. Alternatively, fluid flow may occur between two separate reservoirs connected to the chamber. Such fluid flow may be aided by pressurizing means, such as piezoelectric pump actuators.

In the described embodiments of the present invention, protrusions of the face of the wavefront modifier are arranged so as to form for example diffraction gratings or non-periodic phase structures (NPS). Additionally the arrangement of the protrusions for the described embodiments of the present invention have been of a rotationally symmetric nature about a radial centrepoint of the face of the wavefront modifier. Further arrangements of protrusions of the face of the wavefront modifier are envisaged, wherein the protrusions are shaped accordingly to produce a predetermined wavefront modification. The arrangement of the protrusions of the face of the wavefront modifier are also not being limited to a rotationally symmetric nature about a radial centrepoint of the face of the wavefront modifier. Furthermore, the wavefront modifier need not include protrusions; the wavefront modifier may for example be in the form of a smooth spherical or a spherical lens surface, or a flat surface including a mirror grating. The wavefront modifier may act in a reflective, rather than a refractive, mode.

It is to be understood that any feature described above in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A switchable optical element having a first discrete state and a different, second discrete state, the switchable optical element comprising:
   a fluid system including a first fluid and a different, second fluid;
   a wavefront modifier having a face; and
   a fluid system switch for acting on the fluid system to switch between the first and second discrete states of the element,
   wherein, when the switchable optical element is in the first discrete state, the face of the wavefront modifier is substantially covered by the first fluid, and
   when the element is in the second discrete state, the face of the wavefront modifier is substantially covered by the second fluid,
   characterized in that said fluid system switch comprises:
   a configuration of electrodes for acting on the fluid system by the application of electrowetting forces; and
   a voltage control system for controlling voltages applied to the configuration of electrodes to switch between the first and second discrete states of the switchable optical element.

2. The switchable optical element as claimed in claim 1, wherein the first fluid is electrically conductive and the second fluid is electrically insulative.

3. The switchable optical element as claimed in claim 2, wherein the first fluid and the second fluid are both liquids.

4. The switchable optical element as claimed in claim 1, wherein the configuration of electrodes includes a first electrode having an operative area, and wherein the face of the wavefront modifier and the operative area of the first electrode are arranged in a substantially overlapping arrangement.

5. The switchable optical element as claimed in claim 1, wherein the configuration of electrodes includes a first electrode, a second electrode, and a common, third electrode, the voltage control system applying voltages differently to the first and second electrodes in at least one of the first and the second discrete states of the switchable optical element.

6. The switchable optical element as claimed in claim 1, wherein the switchable optical element further comprises:
   a chamber in which the face of the wavefront modifier is located; and
   a conduit, the conduit having two ends, each end being fluidly connected to the chamber at a separate location,
   wherein the switchable optical element is arranged such that, during a transition between the first and second discrete states of the element, circulatory fluid flow occurs so that fluid passes from the chamber into the conduit via one of the said two ends and fluid passes from the conduit into the chamber via the other of the said two ends.

7. The switchable optical element as claimed in claim 1, wherein the face of the wavefront modifier comprises one or more protrusions, the protrusions providing a predetermined wavefront modification on a given radiation beam of predetermined wavelength when the switchable optical element is in one of said first and second discrete states.

8. The switchable optical element as claimed in claim 7, wherein the protrusions are arranged concentrically about an optical axis.

9. The switchable optical element as claimed in claim 7, wherein the protrusions are linear and arranged parallel each other.

10. The switchable optical element as claimed in claim 7, wherein the protrusions form a diffraction grating.

11. The switchable optical element as claimed in claim 7, wherein the protrusions form a non-periodic stepped profile in a direction transverse to said face.

12. The switchable optical element as claimed in claim 1, wherein said switchable optical element further comprises:
   a second wavefront modifier face, the switchable optical element having third and fourth discrete states associated with the second face; and
   a second fluid system including a third fluid and a different, fourth fluid,
   wherein, when the switchable optical element is in the third discrete state, the second face is substantially covered by the third fluid, and
   when the switchable optical element is in the fourth discrete state, the second face is substantially covered by the fourth fluid,
   and wherein the voltage control system controls voltages applied to the configuration of electrodes to switch between the third and fourth discrete states of the switchable optical element.

13. The switchable optical element as claimed in claim 1, wherein the wave front modifier comprises a birefringent material.

14. The switchable optical element as claimed in claim 1, wherein the first and/or second fluid comprises a liquid crystal material.

15. An optical scanning device for scanning an information layer, the device comprising the switchable optical element as claimed in claim 1, said optical scanning device comprising:
   a radiation source system for emitting a first radiation beam of a first predetermined wavelength and a second radiation beam of a second predetermined wavelength; and
   an objective lens system for converging the radiation beams on respective information layers,
   wherein a first predetermined wavefront modification is provided on the first radiation beam when the switchable optical element is in the first discrete state, and
   a second predetermined wavefront modification is provided on the second radiation beam when the switchable optical element is in the second discrete state.

16. The optical scanning device as claimed in claim 15, wherein the first predetermined wavefront modification at least approximates a spherical aberration and/or defocus.

17. The optical scanning device as claimed in claim 15, wherein the second predetermined wavefront modification is at least approximately flat.

18. The optical scanning device as claimed in claim 15, wherein the radiation source system emits a third radiation beam of a third predetermined wavelength,
   and wherein a third predetermined wavefront modification is provided on the third radiation beam when the switchable optical element is in the second state.

19. The optical scanning device as claimed in claim 18, wherein the third predetermined wavefront modification is either at least approximately flat, or at least approximates a spherical aberration and/or defocus.

* * * * *